Dec. 19, 1939.   J. FITCH   2,183,740

VALVE FOR SPRAYERS

Filed Dec. 13, 1938

INVENTOR
John Fitch
BY
ATTORNEY

Patented Dec. 19, 1939

2,183,740

UNITED STATES PATENT OFFICE 2,183,740

VALVE FOR SPRAYERS

John Fitch, Bloomfield, N. J., assignor to Standard Container, Inc., Bloomfield, N. J., a corporation of New Jersey Application December 13, 1938, Serial No. 245,373

1 Claim. (Cl. 251—119)

This invention relates to spraying devices of the character used for the distribution of powdered or liquid insecticides or like preparations and has for its object the provision in such device of a valve means for controlling the air flow from the piston chamber to the insecticide receptacle.

The invention contemplates the utilization of a novel valve means interposed between the piston chamber and insecticide receptacle, and preferably, but not necessarily, disposed within the receptacle, by which, upon forward stroke, of the piston, an air blast is delivered into the receptacle to cause the contents thereof to be sprayed out through a spray nozzle.

A feature of the invention resides in the provision of a valve means for the purpose mentioned wherein the use of springs and other similar valve-moving elements are dispsensed with and the valve is opened and closed solely by piston movement.

Figure 1:
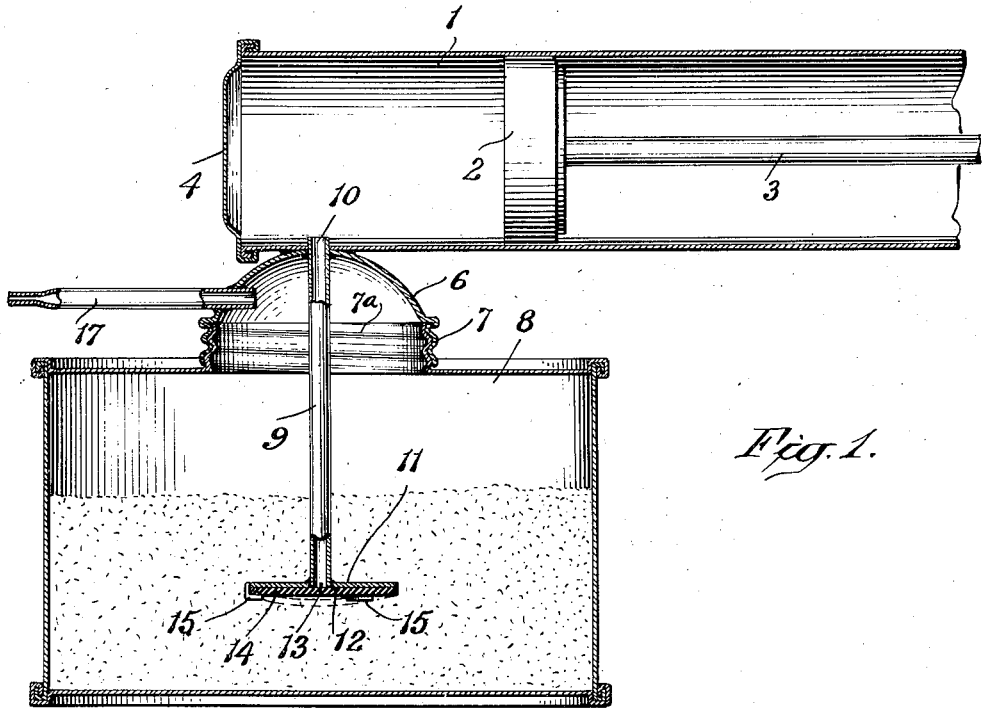
Figure 2:
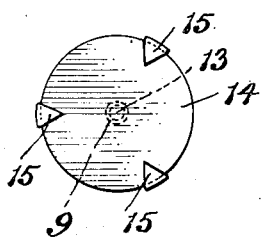

In the accompanying drawing, wherein an embodiment of the invention is shown, Fig. 1 is a sectional view through a spraying device constructed in accordance with the invention, and Fig. 2 is a view of the underside of the valve.

The sprayer shown in the drawing is one particularly intended for the distribution of a powdered insecticide, although the valve mechanism shown may also be employed for use in various other types of sprayers. In the sprayer shown, the cylinder 1 of conventional construction contains the piston 2 of the usual type which is adapted for reciprocal movement within the cylinder, said piston being attached to the rod 3, provided with a handle, not shown, for enabling it to be reciprocated. At its forward or front end, the cylinder is closed by a cap 4 seamed or otherwise attached to the cylinder.

Attached to the cylinder 1 near the cap 4 is a domed closure cap 6 having a threaded portion 7 for reception upon the threaded flange 7ª of the insecticide receptacle 8. An air tube 9 has one of its ends 10 opening within the cylinder 1 near the cap 4, said tube extending downwardly through the domed closure cap 6 and entering into the insecticide receptacle 8. At its lower end the tube is provided with a disk or head 11 which is centrally apertured as at 12 to register with the open end 13 of the tube. Conforming in shape to the disk or head 11 is a diaphragm or flexible disk 14 which extends over and normally closes the open end 13 of the tube. Spaced prongs 15 formed on the head 11 are bent over the periphery of the disk or diaphragm 14 and serve to hold the same against the disk or head and over the end 13 of the tube.

The diaphragm or disk 14 may be made of rubber or some similar flexible material and in its normal position is shown in Fig. 1 wherein it will be seen that the same extends over and closes the open end 13 of the tube. When the piston 2 is manually moved in a direction toward the cap 4, the air displaced by the piston will be directed downwardly through the tube 9 and it will impinge against the diaphragm 14 causing the same to be flexed or bulged away from the open end 13 of the tube as shown in dotted lines in Fig. 1, so that the air will flow out of the end of the tube and past the diaphragm 14 and into the insecticide receptacle to force the contents 16 thereof upwardly and out of the spray tube 17 projecting from the domed closure cap 6. When the piston is retracted or moved in a direction away from the cap 4 the suction produced by such movement will draw the diaphragm back to its normal or closed position shown in full lines in Fig. 1 so that the diaphragm will thus close the end 13 of the tube and prevent insecticide from being drawn up through the tube.

The valve construction thus provided is one in which no spring or other operating elements are employed and a simple, efficient and inexpensive structure results.

What I claim is:

In a sprayer of the character described including a piston chamber and an insecticide receptacle, and having an air tube extending from the piston chamber with one end of the tube located within the insecticide receptacle, a flat, rigid, apertured disc adapted to surround the end of the tube within the receptacle, a flat, flexible member overlying the disc and normally closing the aperture therein, a plurality of spaced prongs integrally formed on the disc and extending from the periphery thereof and bent over to overlie the flexible member and form the sole means for holding the same flatwise against the disc but permitting flexing movement of said member away from the disc under air pressure exerted through the aperture, whereby air may be ejected from between the disc and flexible member at points between the prongs.

JOHN FITCH.